United States Patent Office 2,999,859
Patented Sept. 12, 1961

2,999,859
11,20-BIS OXYGENATED PREGNADIENE-3-ONE 3-KETALS AND PROCESS OF PREPARING THEM
George I. Poos, North Plainfield, and Lewis H. Sarett, Princeton, N.J., assignors to Merck & Co., Inc., Rahway, N.J., a corporation of New Jersey
No Drawing. Filed July 8, 1955, Ser. No. 520,902
22 Claims. (Cl. 260—239.55)

This invention is concerned generally with dimethylcyclopentanopolyhydrophenanthrene compounds and with processes for preparing them. More particularly, it relates to a novel process for preparing $\Delta^{5,16}$-3,20-diketo-11-oxygenated-pregnadiene 3-ketals starting with $\Delta^5$-pregnene-3,11,16,20-tetraone 3-ketals, to the individual steps in this process, and to the intermediate compounds thus obtained.

This application is a continuation-in-part of copending application Serial No. 310,133, filed September 17, 1952, now abandoned.

The $\Delta^{5,16}$-3-ethylenedioxy-11-oxygenated-20-keto-pregnadiene compounds, which are valuable as intermediates in the preparation of adrenal cortical hormones such as cortisone, may be chemically represented by the following structural formula:

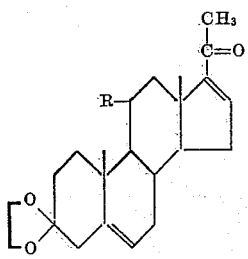

wherein R stands for a keto or hydroxy radical.

These $\Delta^{5,16}$-3-ethylenedioxy-11-(keto or hydroxy)-20-keto-pregnadienes are prepared, in accordance with the present invention, by reacting $\Delta^5$-3-ethylenedioxy-pregnene-11,16,20-trione (Compound 1 hereinbelow) with a secondary alkyl halide and a base to produce a mixture of enol ethers which is separated chromatographically to give the corresponding $\Delta^{5,16}$-3-ethylenedioxy-16-alkoxy-pregnadiene-11,20-dione (Compound 2) and $\Delta^{5,17}$-3-ethylenedioxy-20-alkoxy-pregnadiene-11,16-dione (Compound 3). The $\Delta^{5,16}$-3-ethylenedioxy-16-alkoxy-pregnadiene-11,20-dione is reacted with an alkali metal aluminum hydride to produce $\Delta^{5,16}$-3-ethylenedioxy-pregnadiene-11$\beta$,20-diol (Compound 4) which is reacted with an oxidizing agent to form $\Delta^{5,16}$-3-ethylenedioxy-pregnadiene-11,20-dione (Compound 5). Alternatively, this $\Delta^{5,16}$-3-ethylenedioxy-pregnadiene-11,20-dione may be prepared by reacting the $\Delta^{5,17}$-3-ethylenedioxy-20-alkoxy-pregnadiene-11,16-dione (Compound 3) with a limited amount of a reducing agent to produce $\Delta^{5,17}$-3-ethylenedioxy-20-alkoxy-pregnadiene-16-ol-11-one (Compound 6) which is reacted with an acidic hydrolyzing agent at a temperature below about 50° C. thereby selectively hydrolyzing the enol ether substituent without substantially affecting the 3-ethylenedioxy grouping to form $\Delta^{5,16}$-3-ethylenedioxy-pregnadiene-11,16-dione (Compound 5). When the $\Delta^{5,17}$-3-ethylenedioxy-20-alkoxy-pregnadiene-11,16-dione is reacted with excess reducing agent, both the 11- and 16-ketone groupings are converted to hydroxyl groups, thereby producing $\Delta^{5,17}$-3-ethylenedioxy-20-alkoxy-pregnadiene-11$\beta$,16-diol (Compound 7) which, upon reaction with an acidic hydrolyzing agent at a temperature below about 50° C., is converted to $\Delta^{5,16}$-3-ethylenedioxy-pregnadiene-11$\beta$-ol-20-one (Compound 8). The reactions indicated hereinabove may be chemically represented as follows:

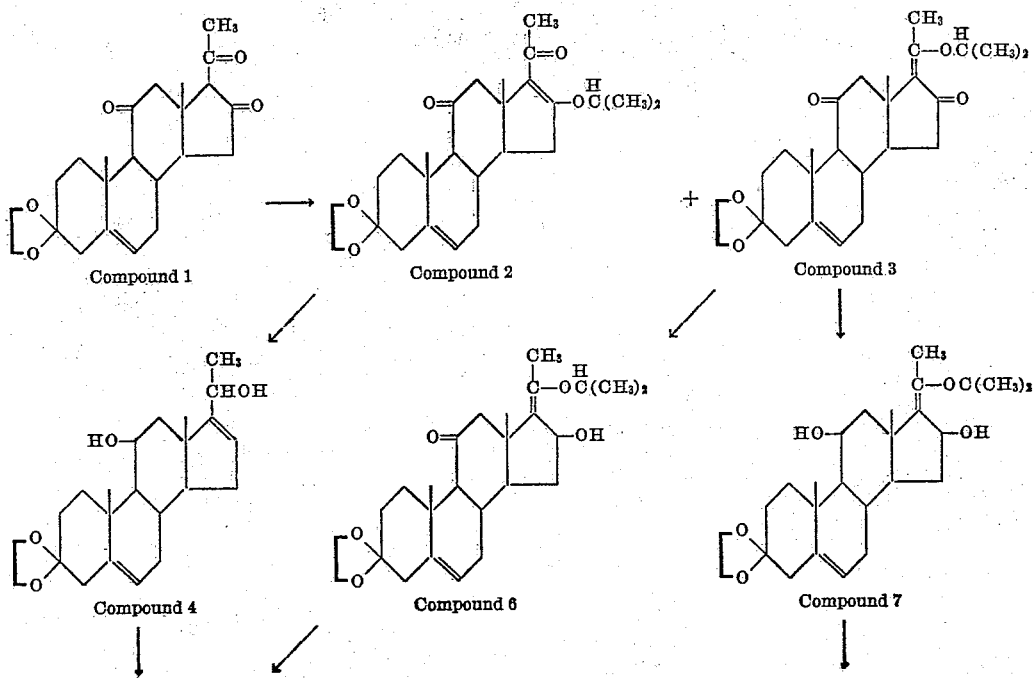

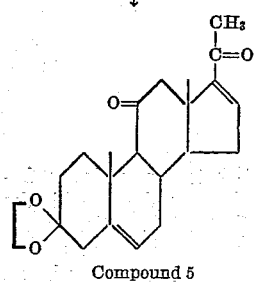

Compound 5

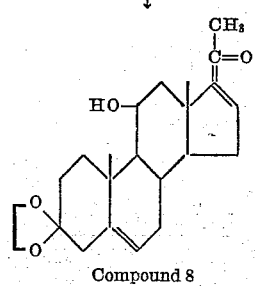

Compound 8

Although in the foregoing series of reactions, the substituent in ring A of the polyhydrophenanthrene nucleus is shown as an ethylenedioxy grouping, any ketal substituent including cyclic ketals, cyclic thioketals, and cyclic hemithioketals can be used in place of the ethylenedioxy radical as the protecting grouping. In place of ketal, an enol-ether or enol-thioether may be used as the protecting group, if desired. Accordingly, instead of Δ⁵-3-ethylenedioxy-pregnene-11,16,20-trione, any Δ⁵-pregnene-11,16,20-trione compound having in a free position a ketal or cyclic ketal substituent hydrolyzable to a 3-keto grouping may be used as starting material in the presently invented process. These Δ⁵-pregnene-11,16-20-triones having a 3-ketal or cyclic ketal substituent may be chemically represented as follows:

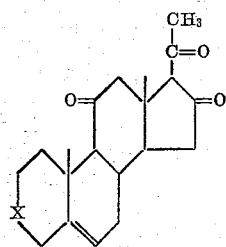

wherein X may be

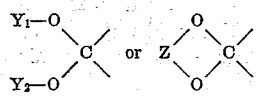

Y₁ and Y₂ being hydrocarbon radicals, and Z being alkylene. In each of the process operations utilized by us in preparing Δ⁵,¹⁶-3,20-diketo - 11 - oxygenated-pregnadiene 3-ketals, the keto group in ring A is blocked with a ketal or cyclic ketal protecting group. At any stage in the process, this keto group may be regenerated by acid hydrolysis whereby the ketal or cyclic ketal grouping is hydrolyzed and, at the same time, the double bond shifts from ring B to ring A thus forming an α,β-unsaturated ketone. It is ordinarily preferred to utilize an ethylenedioxy substituent as the protecting group, and our preferred starting material is thus Δ⁵-3-ethylenedioxy-pregnene-11,16,20-trione.

The Δ⁵-3-ethylenedioxy-pregnene-11,16,20-trione starting material may be prepared in accordance with the following procedure: β-ethoxy-propionaldehyde is reacted with ethyl magnesium bromide to produce 1-ethoxy-3-hydroxypentane which is reacted with chromic acid thereby oxidizing the hydroxy substituent to form 1-ethoxy-3-ketopentane; the latter compound is treated with ethyl ortho formate and ethanol in the presence of hydrogen chloride to produce 1,3,3-triethoxy-pentane which, upon reaction with hot potassium bisulfate, is converted to 3-ethoxy-1,3-pentadiene. The 3-ethoxy-1,3-pentadiene is reacted with benzoquinone in accordance with the Diels-Alder condensation procedure to produce 5-methyl-6-ethoxy-1,4,4a,5,8,8α-hexahydronaphthalene-1,4-dione which is then reacted with hydrogen in the presence of Raney nickel catalyst to form 5-methyl-6-ethoxy-1,2,3,4,4a,5,8,8a-octahydronaphthalene-1,4-dione; the latter compound is reacted with lithium aluminum hydride to form the corresponding diol, 5 - methyl - 6-ethoxy-1,2,3,4,4a,5,8,8a-octahydronaphthalene-1,4-diol, which is reacted with a hydrolyzing agent to produce 5 - methyl-6-keto-perhydronaphthalene-1,4-diol. The reactions indicated above are described in detail in a copending application of one of the present applicants, Serial No. 216,109, filed March 16, 1951, now abandoned. The 5-methyl-6-keto-perhydronaphthalene-1,4-diol is then reacted with N-(3-keto-butyl)-N,N-diethyl-N-methyl- ammonium iodide in the presence of potassium hydroxide to produce 7-keto-4b-methyl-1,2,3,4,4a,4b,5,6,7,9,10,10a-dodecahydrophenanthrene-1,4-diol; this reaction is described in detail in U.S. Patent No. 2,617,828, issued November 11, 1952. The 7-keto-4b-methyl-1,2,3,4,4a,4b,5,6,7,9,10,10a-dodecahydrophenanthrene-1,4-diol is reacted with ethylene glycol in ethylene dichloride solution and in the presence of p-toluene sulfonic acid catalyst thereby forming 1,4 - dihydroxy-4b-methyl-7-ethylenedioxy-1,2,3,4,4a,4b,5,6,7,8,10,10a-dodecahydrophenanthrene. The 1,4-dihydroxy - 4b-methyl-7-ethylene-dioxy-1,2,3,4,4a,4b,5,6,7,8,10,10a-dodecahydrophenanthrene is reacted with cyclohexanone and aluminum isopropoxide in benzene solution to produce the corresponding 1-keto-4-hydroxy-4b-methyl-7 - ethylenedioxy - 1,2,3,4,4a,4b,5,6,7,8,10,10a-dodecahydrophenanthrene. The reactions indicated hereinabove are described in detail in a copending application in which the present applicants are coinventors, Serial No. 286,808, filed May 8, 1952, now abandoned.

The 1-keto-4-hydroxy-4b-methyl-7-ethylenedioxy-1,2,3,4,4a,4b,5,6,7,8,10,10a-dodecahydrophenanthrene is reacted with metal iodide in the presence of potassium tertiary butoxide in benzene thereby forming 1-keto-2,4b-dimethyl-4 - hydroxy-7-ethylenedioxy-1,2,3,4,4a,4b,5,6,7,8,10,10a-dodecahydrophenanthrene; the latter compound is reacted with chromium trioxide-pyridine complex to form 1,4-diketo - 2,4b - dimethyl-7-ethylenedioxy-1,2,3,4,4a,4b,5,6,7,8,10,10a-dodecahydrophenanthrene. The methylation reaction indicated hereinabove is described in detail in a copending application in which one of the present applicants is co-inventor, Serial No. 306,488, filed August 26, 1952, now abandoned. The oxidation reaction indicated hereinabove is described in detail in a copending application in which one of the present applicants is the sole inventor, Serial No. 292,985, filed June 11, 1952. The 1,4-diketo-2,4b - dimethyl-7-ethylenedioxy-1,2,3,4,4a,4b,5,6,7,8,10,10a-dodecahydrophenanthrene is reacted with methallyl iodide in a tertiary butyl alcohol solution of aluminum tertiary butylate, thereby forming 1,4-diketo-2-methallyl-2,4b - dimethyl-7-ethylenedioxy-1,2,3,4,4a,4b,5,6,7,8,10,10a-dodecahydrophenanthrene. The latter compound is reacted in ether-benzene solution with an alkoxy acetylene magnesium bromide to produce the corresponding 1-alkoxy - ethinyl-1-hydroxy-2-methallyl-2,4b-dimethyl-4-keto-7 - ethylenedioxy - 1,2,3,4,4a,4b,5,6,7,8,10,10a-dodecahydrophenanthrene. The reactions indicated hereinabove are described in detail in two copending applications of the present applicants, Serial No. 306,509, filed August 26, 1952, now abandoned, and Serial No. 308,172, filed September 5, 1952, now abandoned.

The 1 - alkoxy-ethinyl-1-hydroxy-2-methallyl-2,4b-dimethyl - 4 - keto-7-ethylenedioxy-1,2,3,4,4a,4b,5,6,7,8,10, 10a-dodecahydrophenanthrene is reacted with a dilute aqueous mineral acid solution to produce the corresponding 1 - carboalkoxymethylene-2-methallyl-2,4b-dimethyl-4 - keto - 7 - ethylenedioxy-1,2,3,4,4a,4b,5,6,7,8,10,10a-dodecahydrophenanthrene; the latter compound is reacted with an alkaline saponifying agent thereby forming 1-carboxymethylene - 2 - methallyl - 2,4b-dimethyl-4-keto-7-ethylenedioxy - 1,2,3,4,4a,4b,5,6,7,8,10,10a-dodecahydrophenanthrene. The 1-carboxymethylene-2-methallyl-2,4b - dimethyl-4-keto-7-ethylenedioxy-1,2,3,4,4a,4b,5,6,7,8,10,10a-dodecahydrophenanthrene is then reacted with an alkali metal in a lower alkanol or liquid ammonia to produce 1 - carboxymethyl-2-methallyl-2,4b-dimethyl-4-hydroxy - 7-ethylenedioxy-1,2,3,4,4a,4b,5,6,7,8,10,10a-dodecahydrophenanthrene. This compound is reacted with an esterifying agent, preferably an alkyl iodide in the presence of a base, to produce the corresponding 1-carboalkoxymethyl- 2-methallyl-2,4b-dimethyl-4-hydroxy-7-ethylenedioxy - 1,2,3,4,4a,4b,5,6,7,8,10,10a-dodecahydrophenanthrene, which is reacted with an oxidizing agent under alkaline conditions to form the corresponding 1-carboalkoxymethyl - 2 - methallyl-2,4b-dimethyl-4-keto-7-ethylenedioxy - 1,2,3,4,4a,4b,5,6,7,8,10,10a-dodecahydrophenanthrene. The latter compound is reacted with osmium tetroxide to form the osmate ester of 1-carboalkoxymethyl - 2 - ($\beta,\gamma$-dihydroxyisobutyl)-2,4b-dimethyl-4-keto-7-ethylenedioxy - 1,2,3,4,4a,4b,5,6,7,8,10,10a-dodecahydrophenanthrene, which is reacted with an aqueous alcoholic solution of an alkali metal bisulfite to produce the corresponding 1-carboalkoxymethyl-2-($\beta,\gamma$-dihydroxyisobutyl)-2,4b - dimethyl-4-keto-7-ethylenedioxy-1,2,3,4,4a,4b,5,6,7,8,10,10a-dodecahydrophenanthrene; the latter compound is reacted with periodic acid to form the corresponding 1-carboalkoxymethyl - 2 - acetonyl-2,4b-dimethyl-4-keto-7-ethylenedioxy - 1,2,3,4,4a,4b,5,6,7,8,10,10a-dodecahydrophenanthrene. This compound is reacted, under substantially anhydrous conditions, with a strong alkali thereby forming $\Delta^5$ - 3 - ethylenedioxy-11,16,20-triketo-pregnene. The reactions indicated hereinabove are described in detail in a copending application in which the present applicants are co-inventors, Serial No. 310,133, filed September 17, 1952.

Where it is desired to utilize another cyclic ketal, ketal, enol-ether substituent to protect the 7-keto grouping, this is introduced in the foregoing procedure by reacting the intermediate 1,4-dihydroxy-7-keto-4b-methyl-1, 2,3,4,4a,4b,5,6,7,9,10,10a-dodecahydrophenanthrene under substantially anhydrous conditions and in the presence of an acid catalyst, with a lower alkanol such as an excess amount of methanol, ethanol, propanol, butanol, and the like, or an excess of another low molecular weight glycol such as propylene glycol, butylene glycol, and the like. It is desired to use an enol-ether as the protecting group, the 1,4-dihydroxy-7-keto-4b-5,6,7,9,10,10a-dodecahydrophenanthrene is reacted, under substantially anhydrous conditions in the presence of an acid catalyst with an alkyl ortho formate.

The reaction of the $\Delta^5$-3-ethylenedioxy-pregnene-11,16-trione, or other $\Delta^5$-3,11,16,20-tetrone 3-ketal with the secondary alkyl halide and a base is conveniently conducted by bringing the reactants together in an organic solvent preferably a ketone solvent such as acetone. As the secondary alkyl halide we ordinarily employ an isopropyl halide such as isopropyl iodide and, as the base, an alkali metal carbonate such as potassium carbonate. The reaction is conducted by heating the reactants together in the organic solvent under substantially anhydrous conditions, preferably at reflux temperature, under which conditions, utilizing acetone as the organic solvent, the reaction is usually substantially complete in about 20 hours. The organic solvent is evaporated from the reaction mixture and the residual material is distributed between water and a water-immiscible solvent such as benzene. The benzene extract, after washing with water, is dried and evaporated to give a crystalline product which, upon recrystallization from a hydrocarbon solvent such as benzene gives substantially $\Delta^{5,16}$-3-ethylenedioxy-16-isopropoxy-pregnadiene-3,11,20-trione. The mother liquor from this recrystallization is evaporated and the residual material is chromatographed on alkaline alumina to give $\Delta^{5,17}$-3-ethylenedioxy-20-isopropoxy-3,11,16-trione. In accordance with this procedure and utilizing various $\Delta^5$-pregnene-3,11,16,20-tetrone 3-ketals, as for example $\Delta^5$ - 3 - alkalenedioxy - pregnene - 11,16,20 - trione such as $\Delta^5$-3-ethylenedioxy-pregnene-11,16,20-trione, $\Delta^5$-3-propylenedioxy-pregnene-11,16,20-trione, $\Delta^5$-3,3-dialkoxy-pregnene-11,16,20-triones such as $\Delta^5$-3,3-dimethoxy-pregnene-11,16,20-trione, and the like, and various secondary alkyl halides such as isopropyl bromide, isopropyl iodide, secondary butyl iodide, and the like, there are obtained the corresponding $\Delta^{5,16}$-16-alkoxy-pregnadiene-3,11,20-trione 3-ketals such as $\Delta^{5,16}$-3-alkalenedioxy-16 - isopropoxy - pregnadiene - 11,20 - dione, $\Delta^{5,16}$ - 3,3 - dialkoxy - 16 - isopropoxy - pregnadiene - 11,20 - dione, and the like, as well as the corresponding $\Delta^{5,17}$-20-alkoxy-pregnadiene-3,11,16-trione 3-ketals such as $\Delta^{5,17}$-3-alkylenedioxy - 20 - alkoxy - pregnadiene - 11,16 - dione, $\Delta^{5,17}$ - 3,3,20 - trialkoxy - pregnadiene - 11,16 - dione, and the like.

The reaction between the $\Delta^{5,16}$-3-ethylenedioxy-pregnadiene-11,20-dione, or other $\Delta^{5,16}$-pregnadiene-3,11,20-trione 3-ketal and the alkali metal aluminum hydride is ordinarily conducted in an ether solvent preferably a cyclic ether solvent such as tetrahydrofuran. As the alkali metal aluminum hydride we ordinarily utilize lithium aluminum hydride. The reaction is conveniently carried out at room temperature under which conditions the reaction is substantially complete in one to two hours. The reduced product is conveniently recovered by adding water dropwise to the reaction mixture to decompose excess alkali metal aluminum hydride, filtering the precipitated inorganic salts, and evaporating the filtered solution to give a crystalline product. This material is chromatographed on alkaline alumina, and the chromatogram eluted with chloroform to give $\Delta^{5,16}$-3-ethylenedioxy-pregnadiene-11,20-diol, or other $\Delta^{5,16}$-pregnadiene-3-one-11,20-diol 3-ketal such as $\Delta^{5,16}$-alkalenedioxy-pregnadiene-11,20-diol, $\Delta^{5,16}$-3,3-dialkoxy-pregnadiene-11,20-diol, and the like, which can be further purified if desired, by recrystallization from a hydrocarbon solvent such as benzene.

The $\Delta^{5,16}$-3-ethylenedioxy-pregnadiene-11,20-diol, or other $\Delta^{5,16}$-pregnadiene-3-one-11,20-diol 3-ketal, is then reacted with an oxidizing agent preferably chromic anhydride in the presence of a tertiary amine; we ordinarily employ pyridine as the tertiary amine. The resulting chromium trioxide-pyridine complex reacts with the $\Delta^{5,16}$-3-ethylenedioxy-pregnadiene-11,20-diol at room temperature to effect selective oxidation of the hydroxy groupings without substantially affecting the carbon-carbon linkages to produce $\Delta^{5,16}$-3-ethylenedioxy-pregnadiene-11, 20-dione. Utilizing this preferred oxidizing agent and conducting the reaction at room temperature, the reaction is ordinarily complete in about 15 hours. The product is recovered by diluting the reaction mixture with water extracting with ether, washing the ether extracts and evaporating to give crude material which can be recrystallized with ether to give $\Delta^{5,16}$-3-ethylenedioxy-pregnadiene-11,20-dione in substantially pure form. In accordance with this procedure and utilizing other $\Delta^{5,16}$-pregnadiene-3-one-11,20-diol 3-ketals as starting material, there are obtained $\Delta^{5,16}$-pregnadiene-3,11,20-trione 3-ketals such as $\Delta^{5,16}$-3-alkylenedioxy-pregnadiene-11,20-dione, $\Delta^{5,16}$-3,3-dialkoxy-pregnadiene-11,20-dione, and the like.

The selective reduction of the 16-keto substituent in the $\Delta^{5,17}$-3-ethylenedioxy - 20 - alkoxy - pregnadiene - 11,16-dione, or other $\Delta^{5,17}$-20-alkoxy-pregnadiene-3,11,16-trione 3-ketal, may be carried out utilizing one molecular equivalent of hydrogen in the presence of a hydrogenation catalyst such as palladium, or utilizing a limited amount of a chemical reducing agent at approximately 20 to 40° C., preferably an alkali metal borohydride such as sodium borohydride, and the like. When an alkali metal borohydride is employed as the reducing agent, the reaction is ordinarily carried out by bringing together the $\Delta^{5,17}$-20-alkoxy-pregnadiene-3,11,16-trione 3-ketal and a limited amount of the alkali metal borohydride in an organic solvent such as ethanol, and maintaining the mixture of reactants at substantially room temperature for a period of about 15 hours thereby effecting a selective reduction of the 16-keto substituent. The reduction product is recovered by adding water to the reaction mixture, evaporating the organic solvents in vacuo, and extracting the resulting aqueous suspension with a water-immiscible organic solvent such as chloroform; the chloroform extracts are dried, evaporated to dryness and the residual material is recrystallized from an organic solvent such as ether-petroleum ether to give $\Delta^{5,17}$-3-ethylenedioxy-20-alkoxy-pregnadiene-16-ol-11-one, or other $\Delta^{5,17}$-20-alkoxy-pregnadiene-16-ol-3,11-dione 3-ketal such as $\Delta^{5,17}$-3-alkylenedioxy-20-alkoxy-pregnadiene-16-ol-11-one, $\Delta^{5,17}$-3,3,20-trialkoxy-pregnadiene-16-ol-11-one and the like. This purified $\Delta^{5,17}$-20-alkoxy-pregnadiene-16-ol-3,11-dione 3-ketal, or if desired the crude reduction product prepared in accordance with the foregoing method, is reacted with an aqueous mineral acid under mild hydrolysis conditions as for example by utilizing a 1% mineral acid solution in a water-miscible organic solvent such as tetrahydrofuran as for example 1% sulfuric acid solution in aqueous tetrahydrofuran, at substantially room temperature for a period of about three to four hours, thereby selectively hydrolyzing the enol ether substituent without substantially affecting the 3-ketal grouping to form $\Delta^{5,16}$-3-ethylenedioxy-pregnadiene-11,20-dione or other $\Delta^{5,16}$-pregnadiene-3,11,20-trione 3-ketal such as $\Delta^{5,16}$-3-alkylenedioxy-pregnadiene-11,20-dione, $\Delta^{5,16}$-3,3-dialkoxy-pregnadiene-11,20-dione, and the like.

The reaction between the $\Delta^{5,17}$-3-ethylenedioxy-20-alkoxy-pregnadiene-11,16-dione or other $\Delta^{5,17,20}$-alkoxy-pregnadiene-3,11,16-trione 3-ketal, with the excess alkali metal borohydride reducing agent is conveniently conducted utilizing substantially the same reaction conditions as those employed in the selective reduction of the 16-keto substituent. Thus, the reaction is carried out by bringing the reactants together in an organic solvent such as ethanol and allowing the reaction mixture to stand at room temperature for a period of about 15 hours. In order to insure complete reduction, however, an additional amount of the alkali metal borohydride, preferably sodium borohydride, is added to the mixture and the resulting mixture is heated under reflux for an additional period. The product is recovered from the reaction mixture utilizing substantially the same procedure as that described hereinabove, that is, water is added to the reaction mixture, the organic solvent such as ethanol is evaporated in vacuo, and the residual material is extracted with chloroform. The chloroform extract is dried, evaporated to dryness, and the residual material is crystallized from ether to give substantially pure $\Delta^{5,16}$-3-ethylenedioxy-pregnadiene-11-ol-20-one, or other $\Delta^{5,16}$-pregnadiene-11-ol-3,20-dione 3-ketal such as $\Delta^{5,16}$-3-alkylenedioxy-pregnadiene-11-ol-20-one, $\Delta^{5,16}$-3,3-dialkoxy-pregnadiene-11-ol-20-one, and the like.

The latter product is hydrolyzed under mild acidic hydrolysis conditions set forth hereinabove in the hydrolysis of $\Delta^{5,17}$-3-ethylenedioxy-20-alkoxy-pregnadiene-16-ol-11-one, and utilizing as the hydrolyzing agent a weak solution of a mineral acid in an aqueous organic solvent, for example 1% sulfuric acid in aqueous tetrahydrofuran at substantially room temperature at which conditions the hydrolysis reaction is ordinarily complete in about three to four hours. The acidic hydrolysis mixture is neutralized with a mildly alkaline solution, for example aqueous potassium carbonate solution, the organic solvent is evaporated in vacuo, and the residual aqueous mixture is extracted with chloroform. Evaporation of the chloroform extract, chromatography of the residual material on alkaline alumina, and recrystallization of the chromatographed material from a lower alkanol such as methanol gives substantially pure $\Delta^{5,16}$-3-ethylenedioxy-pregnadiene-11-ol-20-one, or, depending upon the starting material, other $\Delta^{5,16}$-pregnadiene-11-ol-3,20-dione 3-ketal such as $\Delta^{5,16}$-3-alkylenedioxy-pregnadiene-11-ol-20-one, $\Delta^{5,16}$-3-propylenedioxy-pregnadiene-11-ol-20-one, $\Delta^{5,16}$-3,3-dialkoxy-pregnadiene-11-ol-20-one, and the like.

The $\Delta^{5,16}$-3-ethylenedioxy-pregnadiene-11,20-dione, or other $\Delta^{5,16}$-pregnadiene-3,11,20-trione 3-ketal, obtained as hereinabove described, may be converted to cortisone as follows: the $\Delta^{5,16}$-3-ethylenedioxy-pregnadiene-11,20-dione is dissolved in benzene and contacted with hydrogen at a pressure of about 40 pounds per square inch in the presence of palladium catalyst for a period of about 20 hours to produce $\Delta^5$-3-ethylenedioxy-pregnene-11,20-dione, which is obtained in the form of the dl mixture. This dl $\Delta^5$-3-ethylenedioxy-pregnene-11,20-dione is treated with dimethyloxalate and then with alkali to form the C-21 oxalyl acid derivative. On formation of the strychnine salts of the components of this racemic mixture the d-salt precipitates and may be recovered by filtration. The composition of this strychnine salt and hydrolysis of the C-21 oxalyl acid group gives the optical isomer of $\Delta^5$-3-ethylenedioxy-pregnene-11,20-dione identical with that obtained from naturally occurring materials.

Iodination under alkaline conditions of the 21-oxalyl acid of this natural isomer of $\Delta^5$-3-ethylenedioxy-pregnene-11,20-dione, which may be obtained in the above-described resolution procedure, gives $\Delta^5$-3-ethylenedioxy-21-iodo-pregnene-11,20-dione which is reacted with potassium acetate in acetone to give $\Delta^5$-3-ethylenedioxy-21-acetoxy-pregnene-11,20-dione; M.P. 193.5–194° C.

The last mentioned compound is reacted with hydrogen cyanide and the C-20 cyanhydrin thus formed is dehydrated by reaction with phosphorus oxychloride to give $\Delta^{5,17}$-3-ethylenedioxy-20-cyano-21-acetoxy-pregnadiene-11-one, which is oxidized with potassium permanganate to form $\Delta^5$-3-ethylenedioxy-21-acetoxy-pregnene-17$\alpha$-ol-11,20-dione. This compound is hydrolyzed under acidic conditions, thereby hydrolyzing the 3-ethylenedioxy substituent (or other 3-ketal when other ketal groups are used to protect the 3-position), to form $\Delta^4$-21-acetoxy-pregnene-17$\alpha$-ol-3,11,20-trione, also known as cortisone acetate.

The $\Delta^{5,16}$-3-ethylenedioxy-pregnadiene-11$\beta$-ol-20-one obtained in accordance with this invention, may be treated with pyridine-chromium trioxide complex to produce the corresponding 11-ketone in accordance with the procedure described in a copending application of one of the inventors, Serial No. 292,985, filed June 11, 1952.

The following examples illustrate methods of carrying out the present invention, but it is to be understood that these examples are given for purposes of illustration and not of limitation.

*Example 1*

A solution of 205 mg. of $\Delta^5$-3-ethylenedioxy-pregnene-11,16,20-trione in 4 cc. of acetone was treated with 500 mg. of anhydrous (non-aqueous) potassium carbonate and 0.5 cc. of isopropyl iodide. The resulting mixture was heated under reflux with stirring for twenty hours. Volatile material was removed from the reaction mixture in vacuo. Benzene and water were added to the residue and, after separation, the aqueous layer was extracted with benzene. The combined benzene extracts were washed with 15% potassium carbonate solution and with water. After drying and concentration of the solution, a crude crystalline product melting at 170–225° C. was obtained. Crystallization from benzene gave $\Delta^{5,16}$-3-ethylenedioxy-16-isopropoxy-pregnadiene-11,20-dione melting at 237–

239° C. Chromatography of the residue on alkaline alumina followed by recrystallization from ether gave $\Delta^{5,20}$-3-ethylenedioxy-20-isopropoxy-pregnadiene-11,16-dione melting at 184–186° C.

Example 2

A solution of 388 mg. of $\Delta^{5,16}$-3-ethylenedioxy-pregnadiene-11,20-dione in 10 cc. of anhydrous tetrahydrofuran was treated with a solution of 500 mg. of lithium aluminum hydride in 10 cc. of tetrahydrofuran. After 1½ hours of stirring at room temperature, water was added dropwise to the reaction mixture and the precipitated inorganic salts were separated by filtration. Concentration of the filtrate left a crystalline residue which was chromatographed on alkaline alumina. Elution with ether gave mixtures of products. With chloroform there was eluted $\Delta^{5,16}$-3-ethylenedioxy-pregnadiene-11,20-diol which melted at 186–187° C. after recrystallization from benzene.

Example 3

A solution of 80 mg. of $\Delta^{5,16}$-3-ethylenedioxy-pregnadiene-11,20-diol in 1.3 cc. of pyridine was oxidized with 80 mg. of chromic anhydride in 0.5 cc. of pyridine at room temperature overnight. The reaction mixture was diluted with water and extracted three times with ether. The ether extracts were combined, washed with water, dried and concentrated. Purification of the product by recrystallization from ether gave $\Delta^{5,16}$-3-ethylenedioxy-pregnadiene-11,20-dione melting at 195–197° C.

Example 4

To a solution of 130 mg. of $\Delta^{5,17}$-3-ethylenedioxy-20-isopropoxy-pregnadiene-11,16-dione in 5 cc. of 93% ethanol was added 70 mg. of sodium borohydride. After standing at room temperature overnight, water was added to the reaction mixture and the ethanol was distilled in vacuo. The resulting aqueous suspension was extracted with chloroform and the chloroform extracts were dried and concentrated. Recrystallization of the crude product from ether-petroleum ether gave $\Delta^{5,17}$-3-ethylenedioxy-20-isopropoxy-pregnadiene-16-ol-11-one melting at 152–155° C.

The entire crude reduction product in 8 cc. of tetrahydrofuran was treated with 0.5 cc. of 10% sulfuric acid and was allowed to stand at room temperature for 3½ hours. Excess saturated sodium bicarbonate solution was added to the reaction mixture and the tetrahydrofuran was distilled under reduced pressure. Organic material was extracted with chloroform and the chloroform solution was dried and concentrated. Recrystallization of the residue from ether gave $\Delta^{5,16}$-3-ethylenedioxy-pregnadiene-11,20-dione melting at 193–195° C.

Example 5

To a solution of 104 mg. of $\Delta^{5,17}$-3-ethylenedioxy-20-isopropoxy-pregnadiene-11,16-dione in 5 cc. of 95% ethanol was added 110 mg. of sodium borohydride. After standing at room temperature overnight an additional 100 mg. of sodium borohydride was added and the reaction mixture was heated under reflux for four hours. Water was added, the ethanol was removed by vacuum distillation and the mixture was extracted with chloroform. The dried extract was concentrated and the residue crystallized from ether. Recrystallization from ether gave $\Delta^{5,17}$-3-ethylenedioxy-20-isopropoxy-pregnadiene-11,16-diol melting at 135–144° C.

The entire reduction product was combined in 8 cc. of tetrahydrofuran and treated with 0.5 cc. of 10% sulfuric acid. After 3½ hours at room temperature, potassium carbonate solution was added to the reaction mixture and the tetrahydrofuran was distilled in vacuo. Extraction with chloroform followed by drying and concentration gave crude $\Delta^{5,16}$-3-ethylenedioxy-pregnadiene-11-ol-20-one which after purification by chromatography on alkaline alumina and recrystallization from methanol melted at 214–216° C.

The $\Delta^5$-3-ethylenedioxy-pregnene-11,16,20-trione used as starting material in Example 1 hereinabove can be prepared from 7-keto-4b-methyl-1,2,3,4,4a,4b,5,6,7,9,10,10a-dodecahydrophenanthrene-1,4-diol (the preparation of which is described in U.S. Patent No. 2,617,828 issued November 11, 1952) in accordance with the procedure set forth hereinabove and described in detail in copending application Serial No. 310,133, filed September 17, 1952.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting $\Delta^5$-pregnene-3,11,16,20-tetrone 3-ketal with a secondary lower alkyl halide and a base to produce a mixture of enol ethers comprising the corresponding $\Delta^{5,16}$-16-lower alkoxy-pregnadiene-3,11,20-trione 3-ketal, reacting said $\Delta^{5,16}$-16-lower alkoxy-pregnadiene-3,11,20-trione 3-ketal with an alkali metal aluminum hydride to produce $\Delta^{5,16}$-pregnadiene-11β,20-diol-3-one 3-ketal, and reacting the latter compound with an oxidizing agent thereby forming $\Delta^{5,16}$-pregnadiene-3,11,20-trione 3-ketal.

2. The process which comprises reacting $\Delta^5$-pregnene-3,11,16,20-tetrone 3-ketal with a secondary lower alkyl halide and a base to produce a mixture of enol ethers comprising $\Delta^{5,17}$-20-lower alkoxy-pregnadiene-3,11,16-trione 3-ketal, reacting said $\Delta^{5,17}$-20-lower alkoxy-pregnadiene-3,11,16-trione 3-ketal with one molecular equivalent of a reducing agent to form the corresponding $\Delta^{5,17}$-20-lower alkoxy-pregnadiene-16-ol-3,11-dione 3-ketal, and reacting the latter compound with a mild hydrolyzing agent under acidic conditions thereby selectively hydrolyzing the enol ether substituent without substantially affecting the 3-ketal grouping to form the $\Delta^{5,16}$-pregnadiene-3,11,20-trione 3-ketal.

3. The process which comprises reacting $\Delta^5$-pregnene-3,11,16,20-tetrone 3-ketal with a secondary lower alkyl halide and a base to produce a mixture of enol ethers comprising $\Delta^{5,17}$-20-lower alkoxy-pregnadiene-3,11,16-trione 3-ketal, reacting said $\Delta^{5,17}$-20-lower alkoxy-pregnadiene-3,11,16-trione 3-ketal with excess reducing agent thereby producing $\Delta^{5,17}$-20-lower alkoxy-pregnadiene-11β,16-diol-3-one 3-ketal and reacting the latter compound with a mild hydrolyzing agent under acidic conditions to form $\Delta^{5,16}$-pregnadiene-11β-ol-3,20-dione 3-ketal.

4. The process which comprises reacting $\Delta^5$-pregnene-3,11,16,20-tetrone 3-ketal with a secondary lower alkyl halide and a base to produce a mixture of $\Delta^{5,16}$-16-lower alkoxy-pregnadiene-3,11,20-trione 3-ketal and $\Delta^{5,17}$-20-lower alkoxy-pregnadiene-3,11,16-trione 3-ketal.

5. The process which comprises reacting $\Delta^5$-3-ethylenedioxy-pregnene-11,16,20-trione with isopyropyliodide in the presence of a base to produce a mixture of enol ethers, and subjecting said mixture to chromatographic separation to produce $\Delta^{5,16}$-3-ethylenedioxy-16-isopropoxy-pregnadiene-11,20-dione and $\Delta^{5,17}$-3-ethylenedioxy-20-isopropoxy-pregnadiene-11,16-dione.

6. The process which comprises reacting $\Delta^{5,16}$-16-lower alkoxy-pregnadiene-3,11,20-trione 3-ketal with an alkali metal aluminum hydride to produce $\Delta^{5,16}$-pregnadiene-11β,20-diol-3-one 3-ketal.

7. The process which comprises reacting $\Delta^{5,16}$-3-ethylenedioxy-16-isopropoxy-pregnadiene-11,20-dione with lithium aluminum hydride to produce $\Delta^{5,16}$-3-ethylenedioxy-pregnadiene-11β,20-diol.

8. The process which comprises reacting $\Delta^{5,17}$-20-lower alkoxy-pregnadiene-3,11,16-dione 3-ketal with excess reducing agent thereby producing $\Delta^{5,17}$-20-lower alkoxy-pregnadiene-11β,16-diol-3-one 3 ketal.

9. The process which comprises reacting $\Delta^{5,17}$-3-ethylenedioxy-20-isopropoxy-pregnadiene-11,16-dione with excess sodium borohydride thereby converting both the 11- and 16-ketone groupings to hydroxyl groups to produce $\Delta^{5,17}$-3-ethylenedioxy-20-isopropoxy-pregnadiene - 11$\beta$,16-diol.

10. The process which comprises reacting $\Delta^{5,17}$-20-lower alkoxy-pregnadiene-11$\beta$,16-diol-3-one 3-ketal with a mild hydrolyzing agent under acidic conditions to form $\Delta^{5,16}$-pregnadiene-11$\beta$-ol-3,20-dione 3-ketal.

11. The process which comprises reacting $\Delta^{5,17}$-3-ethylenedioxy-20-isopropoxy-pregnadiene - 11$\beta$,16 - diol with a dilute solution of a mineral acid in aqueous tetrahydrofuran at substantially room temperature thereby selectively hydrolyzing the enol ether substituent without substantially affecting the 3-ethylenedioxy grouping to produce $\Delta^{5,16}$-3-ethylenedioxy-pregnadiene-11$\beta$-ol-20-one.

12. $\Delta^{5,16}$-16-lower alkoxy-pregnadiene-3,11,20 - trione 3-ketal.

13. $\Delta^{5,16}$-3-ethylenedioxy-16-isopropoxy - pregnadiene-11,20-dione.

14. $\Delta^{5,17}$-20-lower alkoxy-pregnadiene-3,11,16-trione 3-ketal.

15. $\Delta^{5,17}$-3-ethylenedioxy-20-isopropoxy - pregnadiene-11,16-dione.

16. $\Delta^{5,16}$-pregnadiene-11$\beta$,20-diol-3-one 3-ketal.

17. $\Delta^{5,16}$-3-ethylenedioxy-pregnadiene-11$\beta$,20-diol.

18. $\Delta^{5,17}$-20-lower alkoxy - pregnadiene-11$\beta$,16-diol-3-one 3-ketal.

19. $\Delta^{5,17}$-3-ethylenedioxy-20-isopropoxy - pregnadiene-11$\beta$,16-diol.

20. $\Delta^{5,16}$-pregnadiene-11$\beta$-ol-3,20-dione 3-ketal.

21. $\Delta^{5,16}$-3-ethylenedioxy-pregnadiene-11$\beta$-ol-20-one.

22. An 11,20-bis-oxygenated-pregnadiene-3-one 3-ketal having a double bond at C–17, which can be represented by the following formula:

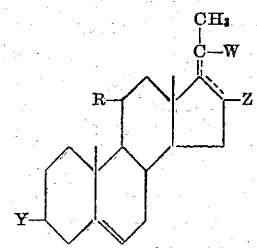

wherein Y is a ketal substituent, R is a radical selected from the group which consists of hydroxy and keto, W is a radical selected from the group which consists of $\beta$-hydroxy, lower alkoxy and keto, and Z is a radical selected from the group which consists of hydroxy, lower alkoxy and keto.

References Cited in the file of this patent

UNITED STATES PATENTS

| | | |
|---|---|---|
| 2,715,621 | Hogg | Aug. 16, 1955 |
| 2,780,648 | Sarett | Feb. 5, 1957 |
| 2,785,203 | Sarett | Mar. 12, 1957 |

FOREIGN PATENTS

| | | |
|---|---|---|
| 1,092,984 | France | Nov. 17, 1954 |